United States Patent [19]

Chatterjee et al.

[11] Patent Number: 5,667,576
[45] Date of Patent: Sep. 16, 1997

[54] ASPHALT EMULSIONS

[75] Inventors: Roger K. Chatterjee, Westerville; Charles R. Milburn, Delaware, both of Ohio

[73] Assignee: Witco Corporation, Greenwich, Conn.

[21] Appl. No.: 409,665

[22] Filed: Mar. 24, 1995

[51] Int. Cl.$^6$ .................................. C09D 195/00
[52] U.S. Cl. ........................................... 106/277
[58] Field of Search ................................ 106/277

[56] References Cited

U.S. PATENT DOCUMENTS

| | | | |
|---|---|---|---|
| 4,209,337 | 6/1980 | Wagner et al. | 106/277 |
| 4,478,642 | 10/1984 | Schilling et al. | |
| 4,629,757 | 12/1986 | Esser et al. | 106/277 |
| 5,407,476 | 4/1995 | Shuey et al. | 106/277 |

OTHER PUBLICATIONS

CA 115:186616, Moriyama et al, "Regeneration of the degraded . . . ". 23 Apr. 1991.
CA 121:185742, Schilling, "Cationic aqueous . . . ". 14 Sep. 1993.
Chem. Abs. 115:186617 (23 Apr. 1991).

*Primary Examiner*—David Brunsman
*Attorney, Agent, or Firm*—Scully, Scott, Murphy & Presser

[57] ABSTRACT

Disclosed are oil-in-water asphalt emulsions comprising asphalt dispersed as the discontinuous phase in an aqueous continuous phase, the emulsions containing one or more anionic emulsifiers selected from the group consisting of compounds of the formulas (Ia), (Ib), (II), and (III)

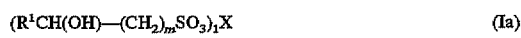

(Ia)

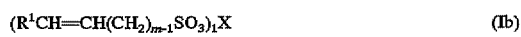

(Ib)

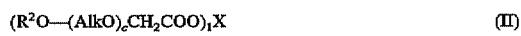

(II)

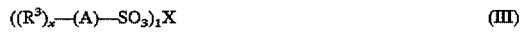

(III)

wherein $R^1$, $R^2$, and $R^3$ are $C_{6-40}$ hydrocarbyl, m is 1–10, X is —H or a cation, c is 1–20, A is phenyl or polycyclic aromatic, k is 1–3, and i is the valence of X.

17 Claims, No Drawings

ASPHALT EMULSIONS

BACKGROUND OF THE INVENTION

The present invention relates to aqueous emulsions of asphalt or coal tar, and in particular to aqueous asphalt emulsions of the oil-in-water type wherein the asphalt component is the discontinuous phase and the aqueous vehicle is the continuous phase. More particularly, the present invention relates to aqueous emulsions of asphalt that can be combined with fillers such as clay, sand and/or fibers (such as fiberglass and/or cotton), and in some cases modified with polymerized materials such as rubber, latex or SBR-type polymers. Such filled emulsions are typically used for applying sealing coatings to driveways, parking lots, pipes, and the like.

Asphalt is conventionally recognized in this field as a dark brown to black cementitious material in which the predominating constituents are bitumens that occur in nature or are obtained in the fractionation of petroleum. Asphalt characteristically contains very high molecular weight hydrocarbons soluble in some hydrophobic solvents. Bitumen is generically known as a class of black or dark-cementitious substances, natural or manufactured, composed principally of high molecular weight hydrocarbons.

Asphalts have been known for many years in various naturally-occurring types, but more and more conventionally asphalts are obtained as a very high molecular weight fraction obtained through the refining or fractionation of petroleum feed streams. In some cases these petroleum fractions are chemically processed prior to or after fractionation; and emulsions made with the resulting treated asphalts are also the subject of this application.

Asphalt is useful in its ability, especially when combined with a fine particulate filler, to form a continuous, highly water-impervious film or coating when applied for instance to roofs, and other exterior surfaces such as driveways, sidewalks, roadways, pipes, and the like.

Coal tars and fractionated coal tars are currently used in such applications, as emulsions and particularly as filled emulsions. The present invention can be considered applicable to the formation of such filled emulsions of coal tar and coal tar derivatives as well as to filled emulsions of asphalt.

Historically, coal tar and derivatives thereof have been incorporated into filled emulsions as the primary asphalt-like material. Filled coal tar emulsions are easily made using any of various surfactants. However, coal tar and its derivatives have become suspected as possibly carcinogenic, so avoiding their use has become desirable. Identifying satisfactory asphalt emulsions which are free of coal tar and coal tar derivatives is thus one of the principal objectives of the present invention.

The task of emulsifying asphalt and keeping it emulsified as a uniform dispersion of asphalt in the water in the presence of filler material, affording easy formulation of the final filled emulsion product, and at the same time obtaining the emulsion in a form which resists premature breaking, has been notoriously challenging. The components of the emulsifying system have to permit formation of the emulsion as desired prior to application of the emulsion to the particular surface. Once the emulsion has been applied and the water has evaporated, the components of the emulsifier system remain behind yet must not be permitted to re-emulsify the asphalt upon subsequent exposure to water. In addition, it is conventional practice to manufacture emulsion for the consumer in large batches, comprising hundreds or even thousands of gallons, from which individual consumer-sized quantities of the emulsion are dispensed for resale. Unfortunately, cationic and many anionic emulsifiers do not permit formation of stable filled asphalt emulsions which satisfy all of these requirements.

The stability of the emulsion before use, and the rapid curing of the emulsion after application, are particularly critical for packaged products sold to consumers but are also important for bulk products sold to contractors and large-scale applicators. The ability to formulate the emulsions, particularly on such large scale, is vulnerable to variations in the constitution of the water used to formulate the emulsion, and particularly vulnerable to the presence of dissolved salts which when present are known as "hardness" of the water. These salts can interfere with the ability to establish the desired emulsion, either through co-acting with the components of the emulsifying system, or otherwise for instance by undesirably altering the ionic strength of the aqueous phase of the emulsion.

The stability and curing behavior of the asphalt emulsion are particularly sensitive to the presence of solids added to the emulsion to form a filled emulsion product. These properties are also sensitive to the amount of such solids and to their identity.

It is also advantageous in some cases to produce a filled emulsion that is thixotropic. This thixotropic, or shear thinning, property minimizes splashing and pooling of the emulsion in low spots while enabling application of a desired thickness.

It is thus an object of the invention to identify emulsifiers for the formation of asphalt emulsions, which are not adversely affected by the presence of solids used to produce filled products.

It is also an object of the invention to identify emulsifying agents for use in formulating asphalt emulsions, which resist premature "breaking" of the emulsion while in storage prior to application. It is furthermore desirable to formulate asphalt emulsions with components that are easily available and relatively inexpensive, and which as well do not adversely affect the quality of the film or coating formed following application of the asphalt emulsion.

The present invention satisfies these objects as well as others that will be apparent herein.

BRIEF SUMMARY OF THE INVENTION

One aspect of the present invention is a storage-stable oil-in-water asphalt emulsion, comprising (A) water as the continuous phase;

(B) one or more anionic emulsifiers selected from the group consisting of (i) compounds of the formula (Ia), (Ib)

$$R^1CH(OH)-(CH_2)_m SO_3)_i X \qquad (Ia)$$

$$R^1CH=CH(CH_2)_{m-1}SO_3)_i X \qquad (Ib)$$

and mixtures thereof, wherein R contains 6 to 40 carbon atoms and is straight or branched aliphatic, aromatic, alkyl-aromatic, aromatic-alkyl, or alkyl-aromatic-alkyl, m is 1–10, X is —H or is a cation such as sodium, calcium, potassium, lithium or ammonium, or an amine of the formula —$N^+H(C_{1-20}$ alkyl$)_2$ or —$N^+H_2(C_{1-20}$ alkyl$)$, and i is 1 or more and is the valence of X;

(ii) compounds of the formula (II)

$$(R^2O-(AlkO)_c CH_2 COOX \qquad (II)$$

and salts thereof with a cation X as defined above, wherein $R^2$ contains 6 to 40 carbon atoms and is straight or branched aliphatic, aromatic, alkyl-aromatic, aromatic-alkyl, or alkyl-aromatic-alkyl, each Alk is straight or branched $C_2H_4$, $C_3H_6$ or $C_4H_8$, and c is 1–200;

and (iii) compounds of the formula (III)

  (III)

wherein $R^3$ contains 6 to 40 carbon atoms and is straight or branched aliphatic, aromatic-alkyl, or alkyl-aromatic-alkyl, A is aromatic, X and i are as defined above, and k is 1, 2 or 3;

(C) asphalt, comprising a discontinuous phase uniformly dispersed in said emulsion; and (D) finely divided particulate filler uniformly distributed throughout said emulsion.

From evaluations of many anionic emulsifiers, and finding little success, it is quite surprising to have found that emulsions in accordance with this invention form storage-stable filled emulsions, without loss of the emulsion and without loss of stability or curing properties.

Another aspect of the present invention is a method of making an oil-in-water asphalt emulsion, comprising combining asphalt, an aqueous continuous phase, and one or more emulsifiers selected from the group consisting of compounds of the formulas (Ia), (Ib), (II), and (III) as defined above, and finely divided particulate filler, in any sequence under emulsifying conditions effective to form an emulsion which exhibits long-term phase stability.

DETAILED DESCRIPTION OF THE INVENTION

It has now, quite unexpectedly, been found that emulsifying the asphalt with any of the aforementioned emulsifiers of formulas (Ia), (Ib), (II), and/or (III) affords uniform dispersibility of the asphalt in water and obtains an emulsion which resists premature breaking. The system forms an emulsion which prior to application is stable, at room temperature conditions, for a reasonably long period of time. The emulsion is able to withstand mixing with fine particulate matter such as clay, fibers, or sand without breaking (becoming two distinct phases of oil and water). The resulting emulsion mix, sometimes called a "filled emulsion", is compatible and stable for a reasonably long period of time.

By correct choice of the emulsifier, the flow properties of the resulting emulsion can be varied anywhere from a relatively thin free flowing liquid to a thixotropic liquid. Once the filled emulsion is applied, for example on the surfaces of driveways, parking lots, piping, or in crack filling application, it cures in a reasonably short time with associated water evaporation. This discovery furthermore permits one to formulate the asphalt emulsion with components that are easily available and relatively inexpensive.

The asphalt (or bitumen) employed in this invention can be either a naturally-occurring asphalt or a manufactured asphalt produced for instance by refining petroleum. It can be a coal tar or coal tar derivative. It can be other heavy bitumenous material as well as heavy organic residuums. Naturally-occurring asphalts suitable for use in this invention include, for example, lake asphalts, rock asphalts and the like. Suitable manufactured asphalts include, for example, straight-run asphalts, propane asphalts, air-blown asphalts, thermal asphalts, blended asphalts, and the like. As used herein, the term "asphalt" includes materials sometimes referred to as "bitumen". A further description of asphalt useful in this invention may be found in the "Encyclopedia of Chemical Technology", Volume 3, at pp. 284–327, the content of which is hereby incorporated herein by reference.

Asphalts preferred for use in this invention have an initial viscosity (i.e. the viscosity prior to emulsification) at 60° C. of from about 100 to about 20,000 poise, although asphalts having higher or lower viscosities can also be useful. The viscosity may be determined by the procedures described in ASTM Test Method D2171. The asphalt quality can also be described by hardness or penetration number. Typically, asphalts in the penetration range of 5 to 400 and preferably 20 to 150 are used, but asphalts with higher or lower values can be used. For some applications, such as driveway sealers, the preference is for harder asphalts (lower penetration number) so that the asphalt can resist softening by drippings of petroleum based products.

The emulsifiers of the present invention can include (i) one or more compounds corresponding to either or both of the following formulas (Ia) and (Ib):

  (Ia)

  (Ib)

wherein in each of formulas (Ia) and (Ib), $R^1$ contains 6 to 40 carbon atoms. Preferred $R^1$ groups include straight and branched alkyl groups containing 9–25, and preferably 15–17, carbon atoms. Preferred $R^1$ groups containing an aromatic moiety include these wherein the aromatic moiety is phenyl. Other aromatic moieties include naphthalene, indanyl and indenyl. Examples of groups with an aromatic moiety include phenyl, alkyl-substituted phenyl, benzyl and alkyl-substituted benzyl. In formulas (Ia) and (Ib), m is 1–10 and preferably 2–4.

Preferred compounds include those known generically as olefin sulfonates, which are mixtures of long chain sulfonate salts prepared by sulfonation of long chain olefins. Because of the nature of the sulfonation process, the olefin sulfonates generally comprise mixtures of alkene sulfonates and hydroxy alkane sulfonates. Particularly preferred olefin sulfonates include, but are not limited to, alpha-olefin sulfonates.

Preferred examples of these olefin sulfonates useful in the present invention are those sold by Witco Corporation under the name "Witconate AOS", and "Witconate AOS-PC".

The emulsifiers useful in the present invention also include one or more carboxylated nonionics of the formula (II):

  (II)

and/or salts thereof with a cation X as defined above. In formula (II), $R^2$ contains 6 to 40 carbon atoms and can be an alkyl group which can be straight or branched. Examples of such alkyl groups include tetradecyl, tridecyl, and ethylhexyl. Preferred $R^2$ groups include any of those described above with respect to preferred $R^1$ groups. A preferred example of $R^2$ as a substituted phenyl group is nonyl phenol. Each (AlkO) group can be ethoxy, propoxy or butoxy. The preferred $(AlkO)_c$ can be a chain of randomly assembled ethoxy and propoxy units, a homo-oligomer of only ethoxy or only propoxy units, a block copolymer containing one or more blocks of repeating ethoxy units and one or more blocks of repeating propoxy units, or other combinations of ethoxy and propoxy. As noted, the total number c of alkoxy units is 1–200, preferably 1–60 and more preferably 5–20.

The emulsion can also comprise one or more alkyl aryl sulfonates of the formula (III):

$$((R^3)_i\text{—}(A)\text{—}SO_3)_kX \qquad (III)$$

wherein i and X are as defined hereinabove. Each $R^3$ group contains 6 to 40 carbon atoms. Preferred $R^3$ groups include straight or branched alkyl groups containing to 6 to 40, preferably 6 to 24, and more preferably 12 to 14, carbon atoms. Other preferred $R^3$ groups include aromatic-alkyl, such as benzyl or phenethyl, it being noted that $R^3$ should be selected so that an aromatic moiety is not bonded directly to A. Preferably A is a monocyclic or polycyclic aromatic group, preferably phenyl or naphthyl and more preferably phenyl, and k is 1, 2 or 3. Preferably, k is 1.

It should be recognized that, if desired, amounts of other emulsifying components (such as amphoteric and nonionic emulsifiers) may be present together with the one or more compounds of the foregoing formulas (Ia), (Ib), (II), and/or (III). Thus, while the advantages attributed to the present invention can be realized by employing solely one or a mixture of the compounds of the foregoing formulas (Ia), (Ib), (II), and/or (III), as the emulsifying components, the scope of the present invention is not confined to those systems which exclude the presence of other emulsifying agents so long as they are compatible with the emulsifying capabilities of the compounds described herein. Indeed, the compatibility and synergy of these compounds when used together with other emulsifying agents, while still being able to maintain a storage-stable emulsion, is another valuable and unexpected aspect of this invention.

For instance, one may optionally include one or more amphoteric emulsifiers, particularly those of the formula (IVa), (IVb)

$$R^4\text{—}(OC_3H_6)_{0-1}\text{—}(C(O)NH(CH_2)_{1-3})_{0-1}\text{—}N(Z^1)(Z^2)_{0-1}\text{—}ZCOOX \qquad (IVa)$$

$$R^4\text{—}(OC_3H_6)_{0-1}\text{—}(C(O)NH(CH_2)_{1-3})_{0-1}\text{—}N(Z^1)(Z^2)_{0-1}\text{—}ZSO_3X \qquad (IVb)$$

wherein X is as defined above, $R^4$ is straight or branched alkyl or alkylene, or cyclic or heterocyclic aromatic which is optionally substituted with alkyl, and contains 4 to 40 carbon atoms and 0–5 carbon-carbon double bonds, $Z^1$ and $Z^2$ are independently of each other H, $C_fH_{2f+1}$ or $C_fH_{2f}OH$ wherein f is 1 to 6 and preferably 1, 2 or 3 or, in formula (IVa), one of $Z^1$ and $Z^2$ can be —ZCOOX, and Z is $(CH_2)_f$, $CH_2CH_2OCH_2CH_2$, or $CH_2CHOHCH_2$ Formulas (IVa) and (IVb) embrace betaines, sulfobetaines (sultaines), glycinates and propionates, which are commercially available and/or can readily be synthesized.

Examples of amphoteric emulsifiers include fatty betaines such as lauryl dimethyl betaine (e.g. REWOTERIC® AM-DML-35)(this and all other REWOTERIC®-branded compounds are marketed by Witco Corp.) and N-lauryl-beta-iminopropionic acid, mono-sodium salt (e.g. REWO-TERIC® AM-LP); glycinates such as N-cocoylamidoethyl-N-(2-hydroxyethyl)-N-carboxymethyl glycine, disodium salt (e.g. REWOTERIC® AM-2C-W) and the N-lauroyl analog thereof (e.g. REWOTERIC® -AM-B-15); propionates such as sodium cocoamphopropionate (e.g. REWO-TERIC® AM-KSF-40); and sulfobetaines such as lauryl hydroxy sultaine (e.g. REWOTERIC® AM-HC) and coca-midopropyl hydroxysultaine (e.g. REWOTERIC® AM-CAS).

Preferred $R^4$ groups in formulas (IVa) and (IVb) include alkyl and alkylene radicals derived from fatty acids. Other preferred $R^4$ groups include benzyl, alkyl-substituted benzyl, and saturated and unsaturated 5-member and 6-member rings containing as the ring atoms exclusively carbon, or carbon and 1 or 2 nitrogen atoms, such as piperazine and alkyl-substituted piperazine. $R^4$ can contain 4 to 40 carbon atoms, preferably 8 to 24 carbon atoms and more preferably 12 to 18 carbon atoms. The filled emulsions of the present invention also include a filler component which is composed of finely divided particulate material that does not react chemically with the other components. Examples include clay, synthetic or naturally occurring fibers, lime, sand and/or carbon black. The particle size distribution should be well below that of aggregate, such as that which is bound with asphalt to create paving material. The particle size can be that of conventional fillers currently used in coal tar asphalt emulsions, but is preferably, generally about 0.5 microns to about 0.01 millimeters up to about 2 or even 3–5 millimeters.

The emulsions of the present invention will of course also contain water, and may contain other components that can be present in filled asphalt emulsions without interfering with the properties of the filled emulsions of the present invention. Such optional additional ingredients particularly include but are not limited to fuel oil, kerosene, antistrip agents, latex or other polymers compatible with the emulsion, and agents such as thixotropicity agents to adjust and control the viscosity of the final product.

When the intended end use is a product having a relatively less viscous nature, such as for driveway sealing, if the emulsifier present is an amphoteric the viscosity can be adjusted as desired by addition of an anionic or nonionic emulsifier (or both).

The relative amounts of the asphalt, the aqueous phase, and the emulsifying component, are of course a function of the fact that the product (whether filled or unfilled) must take the form of an oil-in-water emulsion of the asphalt in the aqueous phase as the continuous phase. As such, then, the permissible amounts of the asphalt, water, and emulsifying components in the unfilled emulsion can vary within relatively large ranges, the asphalt comprising about 5 to about 95 percent by weight of the emulsion, and preferably the narrower range of about 50 to about 70 weight percent of the emulsion.

The filled emulsion contains about 10 to about 90 percent by weight of the filled emulsion, preferably about 10 to about 70 percent by weight, and more preferably about 10 to about 30 percent by weight of the filled emulsion. The emulsifying component, as the total effective amount of compounds of formulas (Ia), (Ib), (II), and (III), defined above, will generally comprise (but is not restricted to) about 0.1 to about 5.0 percent weight of the filled emulsion, and preferably comprise the narrower range of about 0.2 to about 2.0 weight percent of the emulsion. The water generally comprises but is not restricted to about 20 to about 70 percent by weight of the filled emulsion, or more narrowly about 30 to about 50 weight percent of the emulsion.

The pH of the emulsion can be about 1 to about 14, but is preferably about 7 to about 10. If pH adjustment is necessary during formulation, it can be accomplished by addition of small but effective mounts of base such as sodium hydroxide or acid such as sulfonic acid.

Preparation of the emulsion involves relatively straight-forward application of conventional emulsification technology. The asphalt when emulsified should preferably be in the form of very fine droplets or particles having a diameter on the order of about 0.5 to about 50 microns, preferably about 5 to about 10 microns. To obtain particle sizes that permit emulsification of the asphalt, the asphalt component when formulated into the emulsion must be hot enough to be liquid but not so hot as to cause the aqueous phase to boil off, which obviously would break the emulsion.

Emulsification can be carried out in a mill of conventional design known to those of ordinary skill in this art, such as a colloid mill, which simultaneously intimately mixes the water, asphalt and emulsifying components using high shear. The emulsifying compounds used in the present invention can be added simultaneously with the water and the asphalt, or more preferably can be dissolved in the water prior to introduction of the asphalt into the resulting solution.

The desired filled asphalt emulsion is made by mixing the filler(s), that is, fibers, clays, lime and/or sand and/or other additives, into the emulsion. Preferably, the filler components and water are pre-mixed and then added to the emulsion after it is formed. However, the filler components can be added per se, or pre-mixed with any other emulsion component, and combined with all the other components in the mill or thereafter.

Asphalt emulsions prepared in accordance with the present invention exhibit a number of advantageous properties, notably, emulsions formed with the compounds of the foregoing formulas (Ia), (Ib), (II) and/or (III), resist breaking to a superior and unexpected degree even when formulated with filling components, and even when made with water, including i.e. "hard" water, containing salts dissolved therein. In general, the emulsions prepared in accordance with the present invention resist generally "breaking" to a superior and unexpected degree compared to emulsions prepared with other emulsifying systems.

Another conspicuous advantage of the emulsions of the present invention is that they permit the formation of useful, stable asphalt emulsions while avoiding the use of coal tar and of products derived from coal tar. It is desirable to avoid the use of coal tar and its derivatives, as they have been implicated in recent years as suspected carcinogens. However, as discussed herein, the task of identifying suitable materials providing the valuable properties afforded by coal tar or its derivatives has not been achievable. The present invention, however, satisfies that significant objective.

The following examples are provided for purposes of illustration and are not intended to limit the scope of the present invention.

EXAMPLE 1

An asphalt emulsion was prepared by combining in a Charlotte G-5 colloidal emulsion mill, "AC-20" asphalt (Ashland Oil Co.) and 2 wt. % (by weight of the emulsion) of a 35 wt. % aqueous solution of "Witconate AOS" (Witco Corp.), a mixture of alpha-olefin sulfonates of formulas (Ia) and (Ib) set forth herein. The solution had been prepared at 100° F. The asphalt was at 280°–285° F. when used to make the emulsion. The emulsion had a pH of 7.8.

The resulting emulsion was stable and had excellent quality. The emulsion was then mixed with varying amounts of a premixed Sealer "A" at room temperature. Sealer "A" had the composition set forth in Table A:

TABLE A

| Lime | 30 wt. % |
| Emulsion Grade Clay | 4 wt. % |
| Silica Sand | 12 wt. % |
| Bentonite Clay | 7 wt. % |
| Carbon Black | 1 wt. % |
| Fiber | 0.5 wt. % |
| Water | 45.5 wt. % |

The mixtures formed by mixing Sealer "A" with the emulsion were assessed for physical state after 1–10 days, 30 days, and 60 days. Also, the performance was observed when the mixtures were spread on a metal surface and cured at room temperature. The results are given in Table 1:

TABLE 1

Emulsions made with "Witconate AOS", mixed with Sealer "A" (premixed) at room temperature.

| Amt. of Emulsion (as wt. % of mixture) | Amt. of Sealer "A" (as wt. % of mixture) | Mixture Observation 1–10 days | 30 days | 60 days | Curing of Mixture |
|---|---|---|---|---|---|
| 70 | 30 | very thin, stable | same as 1 day | same as 1 day | 4–6 hrs. cure/good |
| 50 | 50 | thin, stable | same as 1 day | same as 1 day | 4–6 hrs. cure/good |
| 40 | 60 | thin, stable | same as 1 day | same as 1 day | 4–6 hrs. cure/good |
| 30 | 70 | thin, stable | slightly thick, good | same as 30 days | 4–6 hrs. cure/good |
| 25 | 75 | slightly thick, stable | slightly thick, good | same as 1 day | 4–6 hrs. cure/good |
| 20 | 80 | thick, stable | same as 1 day | same as 1 day | 4–6 hrs. cure/good |
| 15 | 85 | thick, stable | same as 1 day | same as 1 day | 4–6 hrs. cure/good |
| Commercial Driveway Sealer | | thick, stable, slight thixotropic | same as 1 day | same as 1 day | 4–6 hrs. cure/good |

The times set forth under the heading "Curing of Mixture" in Table 1 and thereafter are the length of time within which the emulsion cured and dried to a coating.

EXAMPLE 2

An asphalt emulsion was prepared using "Emcol CNP-120" (Witco Corp.), a 10-mole ethoxylate of nonyl phenol carboxylate anionic emulsifier in about 10 wt. % water at 2.0% use level (by weight of the emulsion). Emulsifier solution pH was adjusted to 10.0 by addition of NaOH. "AC-20" asphalt (Ashland) was used at 280° F. to make the emulsion in a Charlotte G-5 colloidal emulsion mill. The above emulsion was then mixed at different ratios with premixed Sealer "A" defined in Table A in Example 1. Mixes were made at room temperature. The performance of the resulting mixtures is set forth in Table 2.

TABLE 2

Emulsions made with "Emcol CNP-120", mixed with Sealer "A" (premixed) at room temperature.

| Amt. of Emulsion (as wt. % of mixture) | Amt. of Sealer "A" (as wt. % of mixture) | Mixture Observation 1–10 days | 30–60 days | Curing Test (2 grams of mixture) |
|---|---|---|---|---|
| 70 | 30 | thin, stable | same as 1 day | 4–6 hrs., good |
| 50 | 50 | thin, stable | same as 1 day | 4–6 hrs., slippery, blackish |

TABLE 2-continued

Emulsions made with "Emcol CNP-120", mixed with Sealer "A" (premixed) at room temperature.

| Amt. of Emulsion (as wt. % of mixture) | Amt. of Sealer "A" (as wt. % of mixture) | Mixture Observation | | Curing Test (2 grams of mixture) |
|---|---|---|---|---|
| | | 1–10 days | 30–60 days | |
| 40 | 60 | slightly thick | same as 1 day | rich, blackish |
| 30 | 70 | thick, stable | same as 1 day | 4–6 hrs., good |
| 25 | 75 | thick, stable | same as 1 day | 4–6 hrs., good |
| Commercial Sealer | | thick, stable, thixotropic | same as 1 day | 4–6 hrs., good |

EXAMPLE 3

An asphalt emulsion was prepared using as an anionic emulsifier dodecyl benzene sulfonate ("Witco 1298", Witco Corp.) at 2.0% use level (by weight of the emulsion). Emulsifier solution pH was adjusted to 10.0 by adding NaOH. "AC-20" asphalt (Ashland) was used at 280° F. to make the emulsion. The emulsion was prepared in a Charlotte G-5 colloidal emulsion mill. It was mixed with premixed Sealer "A" at different ratios, at room temperature. Sealer "A" had the composition set forth in Table A, Example 1. The results are set forth in Table 3.

TABLE 3

Emulsions made with "Witco 1298", mixed with Sealer "A" (premixed) at room temperature.

| Amt. of Emulsion (wt. % of mixture) | Amt. of Sealer "A" (wt. % of mixture) | Mixture Observation | | Curing Test (2 grams of mixture) |
|---|---|---|---|---|
| | | 1–10 days | 30–60 days | |
| 40 | 60 | very thin, stable | same as 1 day | 4–6 hrs., good |
| 30 | 70 | very thin, stable | same as 1 day | 4–6 hrs., good |
| 20 | 80 | thin, stable | same as 1 day | 4–6 hrs., good |

EXAMPLE 4

A coal tar emulsion was prepared using "Witconate AOS" at 2.0% use level (emulsion weight). The emulsifier solution pH was 7.7, and was used as is.

A coal tar sample was used which was fairly soft at room temperature. An emulsion was manufactured in a Charlotte G-5 colloidal emulsion mill by emulsifying the coal tar at 200° F. with water and the emulsifier. The resulting emulsion had a solids content (coal tar) of 61.8%.

The above emulsion was mixed with premixed Sealer "A" defined in Table A, Example 1 at 50/50 (weight:weight). The mixture was a stable emulsion.

COMPARATIVE EXAMPLES

Tests conducted with some other emulsifiers were unable to produce stable filled asphalt emulsions. These results demonstrated that the success of the particular selection of emulsifiers embodied in the present invention is quite unexpected. For instance, a typical anionic emulsifier such as tall oil fatty acids commonly used for manufacturing of rapid-medium set type asphalt emulsions at range of 0.4 to 0.6% use levels, did not produce a stable, filled asphalt emulsion, even at 0.6% and at 1.0% use level (by weight of the emulsion). The emulsifier solution pH was adjusted to 10.0 by adding NaOH. "AC-20" asphalt (Ashland) was used at 280° F. to manufacture the emulsion in a Charlotte G-5 colloidal emulsion mill. The resulting emulsion, after 24 hours storage at room temperature, was mixed with Sealer "A" defined in Table A, Example 1. The results were broken, incompatible emulsions.

Similar tests conducted with cationic emulsifiers, even at higher use levels, demonstrated that cationic emulsifiers could not form a stable emulsion containing as filler fine materials such as clay, lime, fiber, and sand used in driveway sealer application. Emulsion/Sealer "A" mixtures at 50:50 ratio formed incompatible, broken emulsions.

What is claimed is:

1. An oil-in-water asphalt emulsion, comprising
    (A) water as the continuous phase;
    (B) one or more emulsifiers selected from the group consisting of (i) compounds of the formula (Ia), (Ib)

$$(R^1CH(OH)-(CH_2)_mSO_3)_iX \quad \text{(Ia)}$$

$$(R^1CH=CH(CH_2)_{m-1}SO_3)_iX \quad \text{(Ib)}$$

and mixtures thereof, wherein $R^1$ contains 6 to 40 carbon atoms and is straight or branched aliphatic, aromatic, alkyl-aromatic, aromatic-alkyl, or alkyl-aromatic-alkyl, m is 1–10, X is hydrogen, sodium, potassium, lithium, calcium, ammonium, an amine of the formula $-N^+H(C_{1-20}\text{alkyl})_2$ or $-N^+H_2(C_{1-20}\text{alkyl})$, and i is 1 or more and is the valence of X;

(ii) compounds of the formula (II)

$$R^2O-(AlkO)_cCH_2COOX \quad \text{(II)}$$

wherein X is defined above, $R^2$ contains 6 to 40 carbon atoms and is straight or branched aliphatic, aromatic, alkyl-aromatic, aromatic-alkyl, or alkyl-aromatic-alkyl, each Alk is $C_2H_4$, $C_3H_6$ or $C_4H_8$, and c is 1–200; and (iii) compounds of the formula (III)

$$((R^3)_x-(A)-SO_3)_kX \quad \text{(III)}$$

wherein $R^3$ is straight or branched aliphatic, aromatic-alkyl, or alkyl-aromatic-alkyl, A is phenyl or naphthyl, k is 1, 2 or 3, and X and i are as defined above;

(c) asphalt, comprising a discontinuous phase uniformly dispersed in said emulsion; and
    (d) finely divided particulate filler uniformly distributed throughout said emulsion.

2. An emulsion in accordance with claim 1, wherein asphalt comprises about 5 to about 95 percent by weight of the emulsion.

3. An emulsion in accordance with claim 1, wherein asphalt comprises about 50 to about 70 percent by weight of the emulsion.

4. An emulsion in accordance with claim 1, wherein said one or more emulsifiers comprise about 0.1 to about 5 weight percent of the emulsion.

5. An emulsion in accordance with claim 1, wherein said one or more emulsifiers comprise about 1 to about 2 weight percent of the emulsion.

6. An emulsion in accordance with claim 1 comprising one or more anionic emulsifiers selected from the group consisting of compounds of formula (Ia), compounds of formula (Ib), and mixtures thereof.

7. An emulsion in accordance with claim 1 comprising one or more anionic emulsifiers of formula (II).

8. An emulsion in accordance with claim 7 wherein in said formula (II), $R^2$ is alkyl containing 6 to 40 carbon atoms.

9. An emulsion in accordance with claim 8 wherein $R^2$ is an alkyl group containing 8 to 12 carbon atoms.

10. An emulsion in accordance with claim 7 wherein in said formula (II), $R^2$ is phenyl substituted with one or two alkyl groups containing 6 to 40 carbon atoms.

11. An emulsion in accordance with claim 10 wherein said one or more alkyl groups each contain 8 to 12 carbon atoms.

12. An emulsion in accordance with claim 11 wherein $R^2$ is nonyl phenyl.

13. An emulsion in accordance with claim 7 wherein X is —H.

14. An emulsion in accordance with claim 1 comprising one or more anionic emulsifiers of formula (III).

15. An emulsion in accordance with claim 14 wherein k is 1.

16. An emulsion in accordance with claim 14 wherein A is phenyl.

17. An emulsion in accordance with claim 1 wherein said filler comprises one or more materials selected from the group consisting of sand, fiber, clay, lime, and carbon black.

* * * * *

UNITED STATES PATENT AND TRADEMARK OFFICE
CERTIFICATE OF CORRECTION

PATENT NO. : 5,667,576

DATED : September 16, 1997

INVENTOR(S) : Roger K. Chatterjee, et al.

Page 1 of 2

It is certified that error appears in the above-identified patent and that said Letters Patent is hereby corrected as shown below:

On the Title Page, Section [56], line 8: "Regneration" should read --Regeneration--

In the Abstract, lines 6, 7, 8 & 9: "$_1X$" should read --$_iX$--

In the Abstract, line 9: "$)_x$" should read --$)_k$--

Column 2, lines 55 & 57: "$_1X$" should read --$_iX$--

Column 2, line 67: "(R" should read --R--

Column 3, line 8: "$)_x$" should read --$)_k$-- and "$)_1$" should read --$)_i$--

UNITED STATES PATENT AND TRADEMARK OFFICE
CERTIFICATE OF CORRECTION

PATENT NO. : 5,667,576
DATED : September 16, 1997
INVENTOR(S) : Roger K. Chatterjee, et al.

It is certified that error appears in the above-identified patent and that said Letters Patent is hereby corrected as shown below:

Column 4, lines 21 & 23: "$_1X$" should read --$_iX$--

Column 4, line 49: "(R" should read --R--

Column 5, line 1: "$)_x$" should read --$)_k$-- and "$)_1$" should read --$)_i$--

Column 7, line 1: "he" should read --be--

Column 10, lines 25 & 26, Claim 1: "$_1X$" should read --$_iX$--

Column 10, line 45, Claim 1: "$_x$" should read --$_k$--

Signed and Sealed this

Tenth Day of November 1998

Attest:

BRUCE LEHMAN

Attesting Officer

Commissioner of Patents and Trademarks